UNITED STATES PATENT OFFICE.

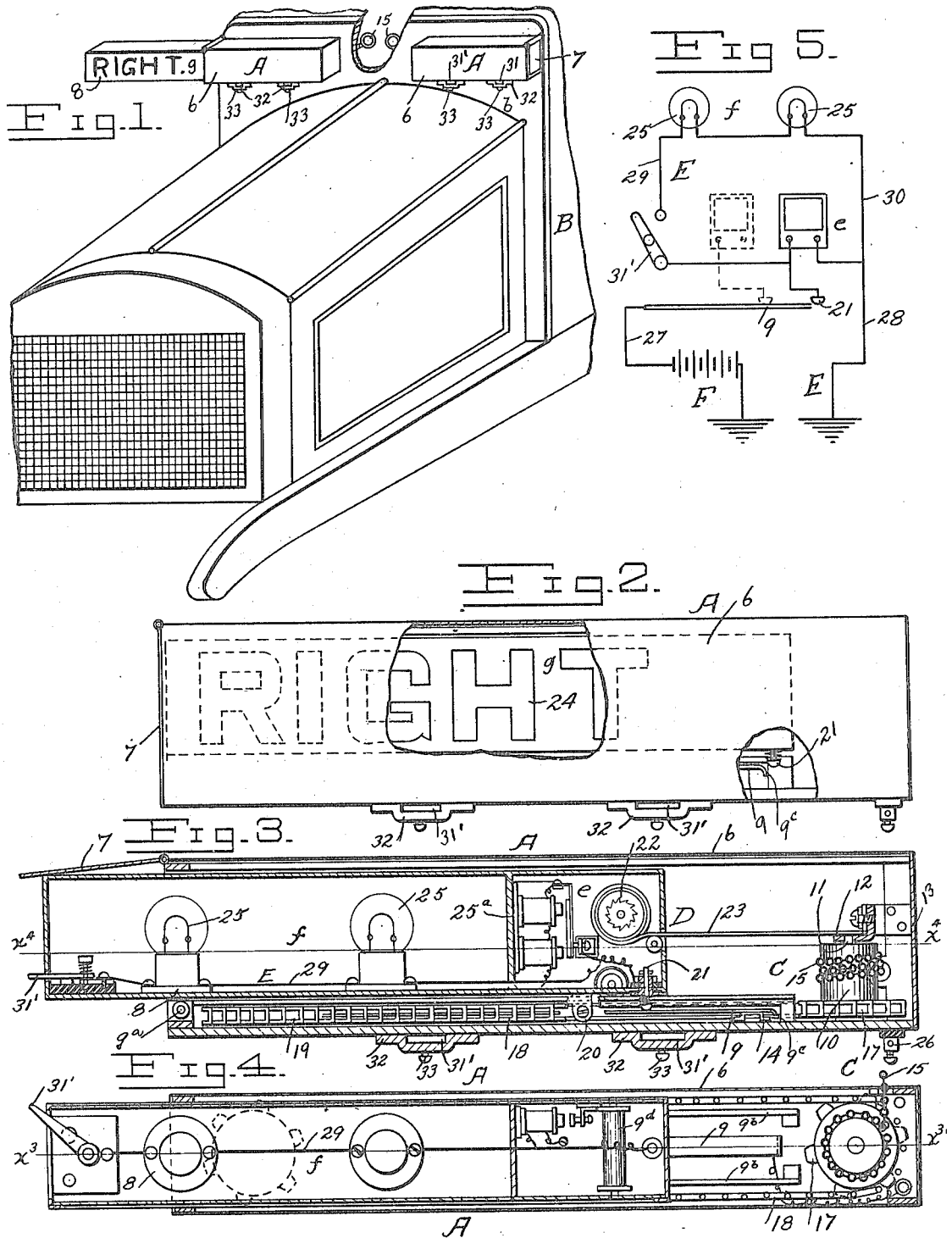

MATSUNOSUKE TAKASHIMA, OF LOS ANGELES, CALIFORNIA.

VEHICLE-SIGNAL.

1,180,087. Specification of Letters Patent. Patented Apr. 18, 1916.

Application filed March 20, 1915. Serial No. 15,985.

*To all whom it may concern:*

Be it known that I, MATSUNOSUKE TAKASHIMA, a subject of the Emperor of Japan, residing at Los Angeles, in the county of Los Angeles and State of California, have invented new and useful Improvements in Vehicle-Signals, of which the following is a specification.

This invention relates to vehicle signals, and more particularly to signals for motor vehicles, whereby the driver or operator of the same may indicate that the vehicle is about to be turned to right or left and approaching or following vehicles or pedestrians may be warned to slacken speed or proceed slowly until such turning may have been executed. Numerous attempts have been made to provide satisfactory signaling means of this general character, but they have been generally open to criticism as too bulky and obtrusive in appearance, or as being too difficult and inconvenient to operate or control. Furthermore, such devices have in general failed to attract attention with sufficient surety so as to be highly effective in performing their desired function.

It is the object of the present invention to provide an improved vehicle signal which will be free from the points and features of objection above mentioned, as well as others, which may be operated with facility, and which will be positive and unfailing in performance of its office; all taken together with relative inexpensiveness and simplicity in construction and organization, and durability.

With the above and other objects in view, the invention consists in the novel and useful provision, formation, construction, combination, association and relative arrangement and inter-relation of parts, members and features, all as hereinafter described, shown in the drawing, and finally pointed out in claim.

In the drawing: Figure 1 is an isometric view of the forward portion of a motor vehicle disclosing two of the vehicle signal devices embodying the invention mounted upon the same, one being provided to indicate vehicle turning movement in a left direction and the other being provided to indicate vehicle turning movement in a right direction. Fig. 2 is a side elevation of one of the improved signal devices, parts being broken away for fullness of illustration; Fig. 3 is a longitudinal vertical sectional view of the same, parts being in elevation, and taken upon the line $x^3$—$x^3$, Fig. 4, and looking in the direction indicated by the arrows; Fig. 4 is a horizontal transverse section taken upon the line $x^4$—$x^4$, Fig. 3, and looking in the direction of the appended arrows parts being in elevation; and, Fig. 5 is a diagrammatic view of signaling means included in the improved signaling device and the means for electrically energizing the same.

Corresponding parts in all the figures are designated by the same reference characters.

Referring with particularity to the drawing, A designates the improved vehicle signal, two of the same being shown in Fig. 1 as mounted upon the dash or forward portion of the body $b$ of a motor vehicle B, each to be utilized to indicate the direction of the proposed turning movement, to left or right respectively.

The working parts of the signaling device are inclosed within a case 6 which may be rectangular and is preferably elongated, one end of such case being provided with a drop hinged closure 7 which is raised to permit projection of a reciprocating carrier 8 normally chambered within the elongated case 6, under the action of operating means C, retracting means D being provided for rechambering the carrier 8 and the audible signaling means $e$ and visible signaling means $f$ mounted upon the same. The slide or carrier 8 preferably consists of an elongated plate mounted upon a transverse roller $9^a$ disposed adjacent the open outer end of the case 6, and upon a roller $9^d$ fixed to the slide and transversing ways $9^b$, and while rollers and ways may be included within the electrical path E whereby the signaling means $e$ and $f$ are preferably energized. When housed, the slide 8 rests upon elongated ways $9^b$ supported upon the case base 14. The end of the case 6 opposite to that provided with the drop closure 7 is preferably permanently closed, so that when the slide 8 and its signaling means are retracted within the case 6, all of the working features of the apparatus are housed within such case and protected from injury or deteriorating action of the weather.

The operating means C are shown as comprising a vertical drum 10 mounted upon a spindle 11 one end of which is held by a bracket 12 projecting forwardly from the inner closed end 13 of the case 6, and the other end of which is fixed in the bottom case wall or base 14, and a chain or like flexible device 15 normally wound upon the drum 10 and extending through a suitable opening in one side of the case and adapted to be grasped and drawn upon to rotate a sprocket 17 fixed to the drum 10 and about which is passed a sprocket chain 18 which likewise passes about an idler sprocket wheel 19 mounted upon the case base 14 adjacent to the outer end of the case 6. A bracket or ear 20 is provided upon the slide 8 and connected with one course of the sprocket chain 18; and when the chain 15 is pulled upon it rotates the drum 10, operates the sprocket chain 18, and advances the slide 8 with its signaling means so as to project it from the case 6 at the open end thereof. Projecting downwardly from the slide 8 adjacent to the inner end thereof is a spring pressed plunger contact post 21 likewise included in the electrical path E; and the slide is supported movably by the head of its screw 21 which rests upon the contact plate 9, and by the roller 9$^d$.

The retracting means D is disclosed as comprising a spring drum 22 mounted upon the slide 8, one end of the ribbon spring 23 thereof being connected with the bracket 12. The slide 8 is box-like in form, inclosed at top bottom sides and ends, the sides being transparent or translucent and provided with opaque lettering 24, the lettering upon one side preferably spelling the word "Right" or "Left" as the case may be to indicate the direction of proposed turning movement of the vehicle and the lettering upon the other side preferably spelling the word "Slow" or some other word;—all in accordance with the method of signaling desired to be employed. Such lettering constitutes further visible signaling means $g$.

The visible signaling means $f$ may comprise incandescent lamps or the like 25, mounted upon the base of the slide 8, and the audible signaling means $e$ may comprise an electrical buzzer mounted upon a base 25$^a$ ranged transversely between the side walls of the box-like slide 8. Electrical energy for the signaling means $e$ and $f$, by the latter of which the signaling means $g$ are illuminated, is supplied from a suitable source of electrical energy G through binding posts 26 fixed to the rear inner end of the case base 14, circuit wires 27 and 28 extending thence respectively to the contact plate 9 and the buzzer $e$. Further circuit wires 29 and 30 extend from the buzzer to the incandescent lamps 25, and the energization of these lamps is controlled by an electrical switch 31 disposed at the outer end of the slide 8 and projecting through a suitable opening in position for manipulation so that the lights may be either operated or not in accordance with prevailing conditions or desire.

The contact plate 9 is mounted upon the case base 14 and in addition to its participation in the distribution of electrical energy for the purpose stated, serves as a track or way for the slide 8 with the contact screw 21 as a foot.

The case 6 may be supported as upon the dash $b$ of the vehicle by brackets or arms 31' projecting from the dash and received in keepers 32 upon the base 14 of the case, the case being made fast to the brackets by means of set screws 33 threaded through the keepers.

The operation, method of use and advantages of the improved vehicle signal constituting the invention will be readily understood from the foregoing description taken in connection with the accompanying drawing and the following statement: With two of the signaling devices A mounted in conspicuous positions upon the vehicle, one at each side, the direction of intended turning of the vehicle may readily be indicated by operating the proper signaling device, and the operation of such two signaling devices will be the same in each case, only the slide 8 of one will be projected to the right and the slide 8 of the other will be projected to the left, and the visible signaling means or wording $g$ will be provided in accordance with the side of the vehicle at which the respective signaling device is disposed. The wording, such as the word "Right" is provided upon the front wall of the box-like slide 8, and the wording such as the word "Slow" not shown in the drawing, is provided upon the back side wall of the box-like slide.

Referring now to the operation of the device, and selecting the device at the right of the vehicle, the slide 8 is normally chambered within the case 6, the chain 15 extending through a suitable opening in the dash in position for convenient manipulation by the driver of the vehicle. When the driver desires to turn the vehicle to the right or just prior to such turning operation, he pulls upon the chain which rotates the drum 10 and operates the sprocket chain 18, which carries the slide 8 with it into projecting position, such as is shown in Fig. 1 in the drawing and partially in Figs. 3 and 4. By this action, the retraction means D are put under a strain. Normally the binding screw 21 is out of contact with or off of the contact plate 9, that is, when the slide is entirely chambered within the case 6, the inner end of such contact plate 9 being provided with a down-turned lip 9$^c$ which facilitates the head of the screw 21 riding up onto the contact plate. As soon as such screw 21 engages with the contact plate an electrically closed circuit is established through the buzzer e and through the lights f if the switch 31 is properly positioned, so that immediately following commencement of projection of the slide 8 and its attendant features an audible signal is given and the box-like slide is illuminated, as at night, so that the wording upon the slide walls is rendered visible. After sufficient signaling has been accomplished the operator or driver merely releases the free end of the chain 15 whereupon the retracting means D withdraws the slide 8 and its attendant features within the case 6, the ribbon spring 23 winding up in the action of the spring drum 22, the slide 8 and its features being withdrawn within the case 6, whereupon the drop closure 7 falls and closes the outer end of such case. This drop closure is automatically opened by the slide as it projects from the case. The buzzer e, or bell or other equivalent audible signaling means calls the attention of the pedestrian and vehicle drivers to the signaling operation, and the wording upon the box-like slide indicates clearly in which direction the vehicle is about to turn and warns fully pedestrians or vehicles to slow down until the turning operation has been completed.

The entire device is simple and relatively inexpensive in construction and complete and positive in performance of the functions required of such a device or mechanism; and the electrical features thereof may be readily supplied with energy from the working electric circuit of the motor vehicle.

It is manifest that many changes and variations may be made in departure from the provision, construction and interrelation of parts and features disclosed, in adapting the invention to varying conditions of use and service, all within the spirit of the invention and a fair interpretation thereof.

Having thus disclosed my invention I claim and desire to secure by Letters Patent:

A signal device of the character disclosed, comprising a housing, movable signaling means normally chambered within the housing, means for projecting such signaling means from the housing to render the signaling means effective, and means for automatically re-chambering the signaling means within the housing; said signaling means comprising a slide, and said operating means comprising a drum, a flexible device adapted to be normally wound upon the drum, and a further flexible device adapted to be actuated by the drum and connected with the slide; and said retracting means comprising a spring drum mounted upon the slide the spring of which is connected at one end with the housing.

In testimony whereof, I have signed my name to this specification in the presence of two subscribing witnesses.

MATSUNOSUKE TAKASHIMA.

Witnesses:
  ALFRED H. DAEHLER,
  TYCIE FULLEN.